(12) United States Patent
Oh (10) Patent No.: US 7,098,605 B2
(45) Date of Patent: Aug. 29, 2006

(54) FULL DIGITAL DIMMING BALLAST FOR A FLUORESCENT LAMP

(75) Inventor: In-Hwan Oh, Cupertino, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 185 days.

(21) Appl. No.: 10/758,520

(22) Filed: Jan. 15, 2004

(65) Prior Publication Data
US 2005/0156534 A1    Jul. 21, 2005

(51) Int. Cl.
G05F 1/00   (2006.01)
(52) U.S. Cl. .................. 315/291; 315/360; 315/307; 315/224; 315/247; 315/DIG. 4
(58) Field of Classification Search ............. 315/291, 315/307, 297, 209 R, 247, 244, 219, 225, 315/224, 292, 194, 360, 362, 325, DIG. 4, 315/DIG. 5, DIG. 7
See application file for complete search history.

(56) References Cited

U.S. PATENT DOCUMENTS

| | | | |
|---|---|---|---|
| 5,039,921 A | | 8/1991 | Kakitani |
| 5,107,184 A | | 4/1992 | Hu et al. |
| 5,331,253 A | | 7/1994 | Counts |
| 5,680,015 A | | 10/1997 | Bernitz et al. |
| 5,691,605 A | | 11/1997 | Xia et al. |
| 5,838,116 A | | 11/1998 | Katyl et al. |
| 5,925,990 A | | 7/1999 | Crouse et al. |
| 6,008,593 A | * | 12/1999 | Ribarich ............... 315/307 |
| 6,011,360 A | * | 1/2000 | Gradzki et al. ......... 315/244 |
| 6,046,551 A | | 4/2000 | Kita |
| 6,147,463 A | | 11/2000 | Luger et al. |
| 6,150,773 A | * | 11/2000 | Ribarich et al. ....... 315/291 |
| 6,160,361 A | | 12/2000 | Giannapoulos et al. |
| 6,181,086 B1 | | 1/2001 | Katyl et al. |
| 6,333,605 B1 | | 12/2001 | Grouev et al. |
| 6,337,544 B1 | | 1/2002 | Wang et al. |
| 6,362,575 B1 | | 3/2002 | Chang et al. |
| 6,469,454 B1 | * | 10/2002 | Mader et al. ............ 315/291 |
| 6,509,699 B1 | | 1/2003 | Kim et al. |
| 6,552,498 B1 | | 4/2003 | Prasad et al. |
| 6,879,114 B1 | * | 4/2005 | Jales et al. ............ 315/209 R |

(Continued)

FOREIGN PATENT DOCUMENTS

DE            43 35 375          10/1993

(Continued)

OTHER PUBLICATIONS

International Search Report for International Application No. PCT/US2005/001237.

Primary Examiner—Haissa Philogene
(74) Attorney, Agent, or Firm—Sidley Austin LLP (57) ABSTRACT

A lamp control circuit is described, containing a power factor corrector, coupled to it a digitally controlled ballast, having power devices. The digitally controlled ballast is capable of powering a lamp. The ballast is controlled by a current feedback loop, coupled between the power devices and the digitally controlled ballast, and a voltage feedback loop, coupled between the lamp and the digitally controlled ballast. Further, a method of operating a lamp-control circuit is presented, the circuit containing a digital controller, an output stage, a current feedback loop, and a voltage feedback loop. In operation the digital controller receives a current feedback signal or a voltage feedback signal from the output stage and the lamp. In response to the received signal the digital controller generates a digital control signal and powers a lamp through the output stage according to the generated digital control signal.

26 Claims, 6 Drawing Sheets

U.S. PATENT DOCUMENTS

| | | | |
|---|---|---|---|
| 6,956,336 B1 * | 10/2005 | Ribarich | 315/247 |
| 2002/0158591 A1 | 10/2002 | Ribarich et al. | |
| 2002/0175640 A1 | 11/2002 | Kim et al. | |

FOREIGN PATENT DOCUMENTS

| | | |
|---|---|---|
| WO | WO 00/40058 | 7/2000 |

* cited by examiner

FULL DIGITAL DIMMING BALLAST FOR A FLUORESCENT LAMP

FIELD OF INVENTION

The invention generally relates to a ballast for circuits powering fluorescent and high intensity discharge lamps, and in particular to a digital ballast with voltage and current feedback loops.

BACKGROUND OF THE INVENTION

Ballasts are circuits used to drive gas discharge lamps, such as fluorescent lamps. Ballasts adjust the lamp current by adjusting the driving frequency. The driving frequency can be adjusted by using analog voltage-to-frequency converters.

Analog ballasts have a large number of external capacitors and resistors to control various parameters, such as a pre-heating time, soft-start time, minimum and maximum driving frequencies, and running frequencies.

Some ballast circuits lower the number of external capacitors and resistors by including digital controllers. Some digital controllers are capable of identifying the type of the driven lamp. Other circuits use the digital controllers to communicate remotely with an external controller. But these digital controllers are still embedded in an analog design.

Ballasts utilizing digital controllers also lack some of the functionalities of regular analog ballasts. For example, in some described ballasts there are no intelligent pre-heating features. Other digital ballasts do not have pre-heating features, or lamp-fault protection, or dimming features. Ballasts, which do describe dimming features, still employ analog circuitry. In some described ballasts, optical couplers are used, again including analog designs.

Among the digital ballasts some designs do not provide short-circuit or load-fault protection. Some have complex pre-heating circuitry with additional auxiliary windings. Also, the external communication involves the high voltage line, an undesirable feature.

Ballasts for automotive applications, such as full-bridge inverters, specialize in 12V voltage applications. Further, they do not describe pre-heating features.

Some designs use digital control functions for specific purposes only, such as identifying the type of the lamp, which is being driven by the ballast. These circuits often have both digital and analog aspects, thus they are not fully digitally controlled.

SUMMARY OF THE INVENTION

Briefly and generally, embodiments of the invention include a lamp control circuit, containing a power factor corrector, coupled to a digitally controlled ballast, which contains power devices. The digitally controlled ballast is capable of powering a fluorescent lamp. The ballast is controlled by a current feedback loop, coupled between the power devices and the digitally controlled ballast, and a voltage feedback loop, coupled between the lamp and the digitally controlled ballast.

Further embodiments include a method of operating a lamp-control circuit, the circuit containing a digital controller, an output stage, a current feedback loop, and a voltage feedback loop. In some embodiments of the method the digital controller receives a current feedback signal or a voltage feedback signal from the corresponding feedback loop. In response to the received signal the digital controller generates a digital control signal and powers a lamp through the output stage according to the generated digital control signal.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1–8 of the drawings. Like numerals are used for like and corresponding parts of the various drawings.

Figure 1:
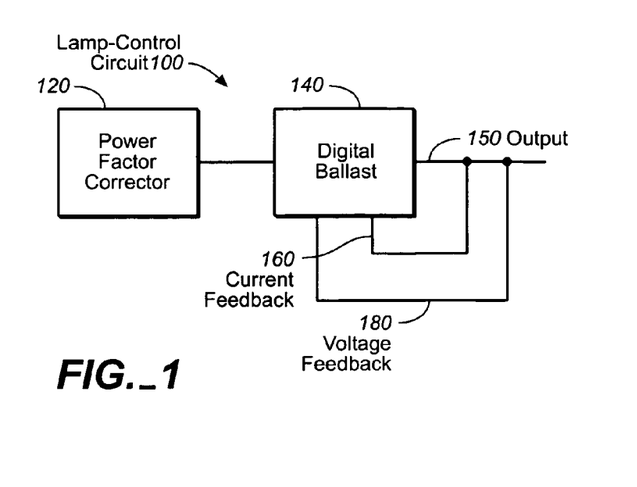
FIG. 1 illustrates a lamp control circuit according to embodiments of the invention.

FIG. 1 illustrates a lamp-control circuit 100 with a digital ballast according to an embodiment of the invention. Light control circuit 100 includes a power factor correction circuit 120, coupled to a digital ballast 140. Digital ballast 140 generates a digitally controlled output voltage through an output terminal 150. The output at output terminal 150 is sensed by a current feedback loop 160 and a voltage feedback loop 180. Feedback loops 160 and 180 are coupled back to digital ballast 140.

Functions of power factor correction circuit 120 include providing an AC input voltage and current essentially in phase with each other. Digital ballast 140 may include a digital controller, microprocessor, or microcomputer. The digital controller is configured to receive feedback signals from current feedback loop 160 and voltage feedback loop 180, and digitally control the output voltage and current according to the received signals.

Figure 2:
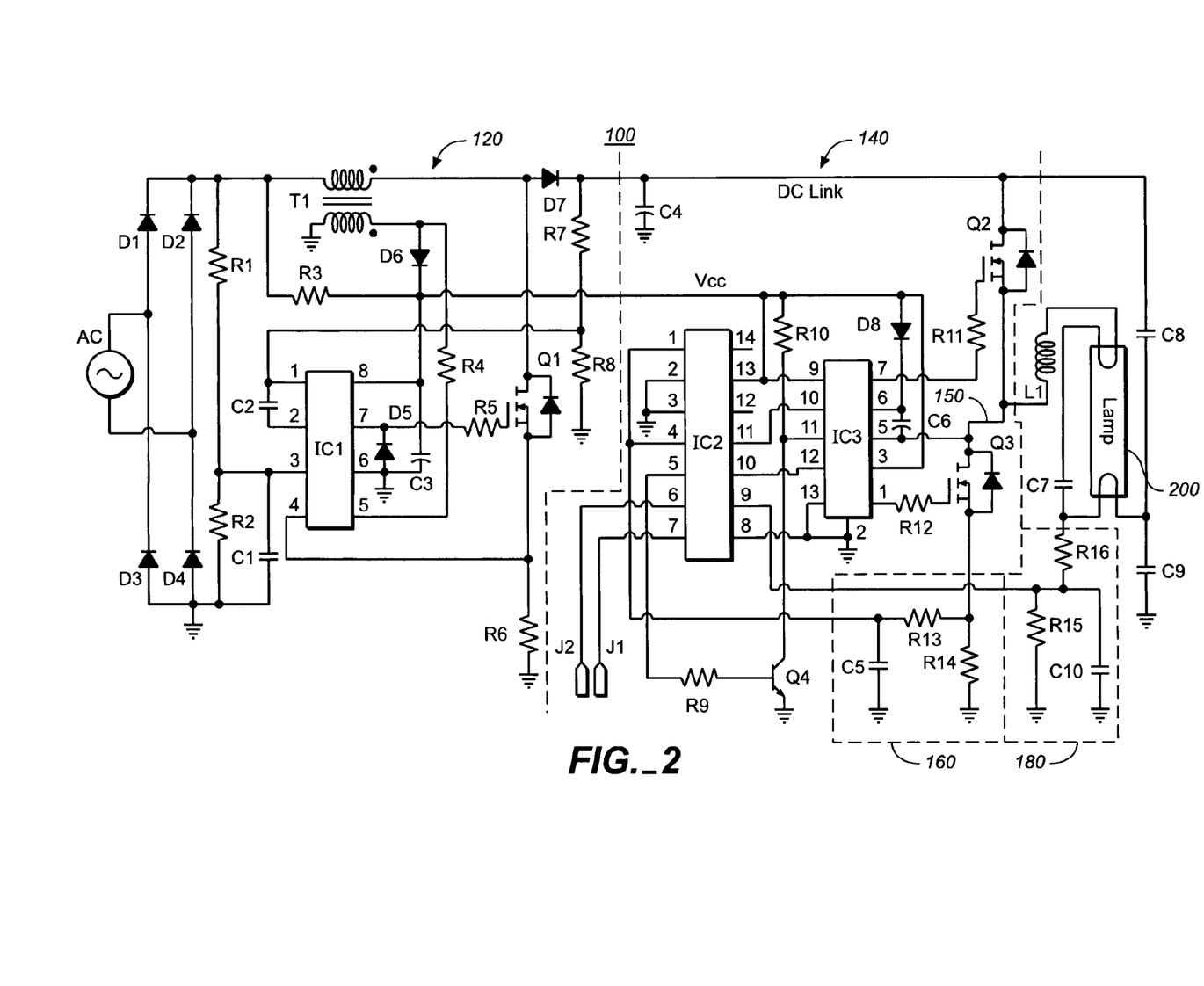
FIG. 2 illustrates a lamp control circuit according to embodiments of the invention.

FIG. 2 illustrates an embodiment of lamp-control circuit 100. Power factor correction (PFC) circuit 120 includes a PFC controller integrated circuit IC1, capacitors C1–C4, resistors R1–R8, diodes D1–D7, power device Q1 and transformer T1. The operating power for PFC controller IC1, as well as for digital controller IC2 and gate driver IC3 can be supplied from the secondary winding of boost inductor T1.

As described above, functions of power factor correction circuit 120 include generating an alternating current in the AC input, where the voltage and the current are essentially in phase. There are many known circuits, configured to perform this task. Therefore, the particular layout of power factor correction circuit 120 will not be described in detail. Power factor correction circuits of any layout are meant to be within the scope of the invention.

A DC link is coupled to digital ballast 140. Digital ballast 140 includes integrated circuit IC2, which can be a digital controller, microcomputer, or microprocessor. IC2 can be, for example, the single chip controller FMS7401 from Fairchild Semiconductor. In some embodiments digital controller IC2 may contain digital control blocks including frequency changeable two-output PWM with a dead time control block, an Analog-to-Digital converter, analog and digital multiplexed input/output ports, an internal EEROM, flash ROM, and RAM memories. The functions of IC2 will be described below in detail.

IC2 is coupled to power device driver IC3. In the embodiment of FIG. 2, output pins 10, 11, and 13 of IC2 are coupled to input pins 12, 10, and 9 of IC3, respectively. In other embodiments input and output pins can be coupled differently. IC3 is coupled to an output stage, which contains power devices Q2 and Q3. Power devices Q2 and Q3 are coupled in series between the DC link, or a high voltage rail, and the ground. Power devices Q2 and Q3 can be bipolar junction transistors or any type of MOS-FET or IGBT devices. In embodiments with bipolar transistors power devices driver IC3 is coupled to the base of the bipolar transistors. In embodiments with MOS-FET power devices, IC3 is coupled to the gates of the MOS-FET power devices.

Lamp control circuit 100 generates an output signal at output terminal 150, located between power devices Q2 and Q3. Output terminal 150 is coupled to inductance L1. Inductance L1 can be coupled to a terminal of lamp 200.

Lamp 200 can be any of the following type of lamps: cold cathode lamps, fluorescent lamps, high-pressure discharge lamps, metal halide lamps, high intensity discharge lamps, and gaseous lamps, or any other lamp with non-linear current-voltage characteristics.

Lamp 200 can have terminals with two ports. In some lamps there is a filament or a cathode coupled between the two ports, as shown in FIG. 2. A capacitor C7 is coupled in parallel with lamp 200, between the first terminal and the second terminal of lamp 200. Capacitor C7 and inductance L1 form a resonant circuit. The capacitance of capacitor C7 and the inductance of inductance L1 can be chosen such that the resonant frequency of their resonant circuit is less than the operating frequency of lamp-control circuit 100.

In some embodiments, power devices Q2 and Q3 are driven by rectangular driver signals, generating an output voltage at output terminal 150 with a rectangular signal shape. The resonant circuit of inductor L1 and capacitor C7 has its own dynamic properties and typically smoothes the rectangular signal shape into an essentially sinusoidal signal.

Current feedback loop 160 includes resistor R14. R14 is coupled in series with power devices Q2 and Q3. Therefore, the current of power devices Q2 and Q3 also flows through R14, generating a voltage across R14. Therefore, the output stage current is sensed as the voltage across R14. In over-load, over-current, or short-circuit situations the output current and correspondingly the current across power devices Q2 and Q3 exceeds a predetermined level. Correspondingly, the voltage of resistor R14 also exceeds a predetermined level. The voltage of resistor R14 is coupled into input pins 1 and 4 of digital controller IC2 through the filter containing capacitor C5 and resistor R13. In other embodiments the details of the coupling between R14 and IC2 can be different. The voltage of resistor R14 exceeding a predetermined level serves as a feedback signal for digital controller IC2. In response, digital controller IC2 controls the output current of lamp-control circuit 100 at output terminal 150. Through this mechanism current feedback loop 160 achieves providing protection for lamp 200 in over-load, over-current, or short-circuit situations.

Voltage feedback loop 180 includes resistor R16. Resistor R16 is coupled to the second terminal of lamp 200. Therefore, resistor R16 senses the voltage at the second terminal of lamp 200. This lamp voltage can vary for a variety of reasons. The lamp voltage can vary during the ignition process, as described below. The lamp voltage can also change because of a change of temperature of lamp 200 for internal or external reasons. The lamp voltage can further change because of any form of decay or erosion of lamp 200, caused, for example, by the degradation of any of its electrodes, the cathode or anode.

If the lamp voltage changes for any of these reasons, resistor R16 senses the change of the lamp voltage. This changed lamp voltage is then fed back through resistor R15 and capacitor C10 to input pin 9 of digital controller IC2. In response, digital controller IC2 can generate a control signal to control the output voltage and accordingly the lamp voltage. This controlling may include varying an operating frequency of lamp-control circuit 100, or shutting down the supply voltage, as described in more detail below. Voltage feedback loop 180 plays an important role in controlling lamp-control circuit 100 during the ignition process.

Driven by the feedback from current feedback loop 160 and voltage feedback loop 180, digital controller IC2 is capable of maintaining the brightness of lamp 200 during varying operating conditions.

Finally, the second terminal of lamp 200 is coupled to the DC link, or high voltage rail, through a capacitor C8 and to the ground through capacitor C9. The functions of this capacitor bridge includes providing about half of the DC link voltage at the second terminal of lamp 200.

Digital controller IC2 is operable to control lamp-control circuit 100 digitally. In some embodiments the digital control includes IC2 receiving external commands through input/output pins J1 and J2. These input/output pins allow for external communication with lamp-control circuit 100, for example, enabling real-time dimming of lamp 200. The external commands can be digital, allowing, for example, wireless communications with lamp-control circuit 100. Communication methods using the pins J1 and J2 include the RS-232, the Digitally Addressable Lighting Interface (DALI), and the I$^2$C.

Another feature of the embodiment of FIG. 2 is that many functions, including a soft-start time, providing a pre-heating time, and changing a driving frequency can be carried out by software. Therefore, some embodiments of the invention can operate without passive capacitors or resistors for adjusting the pre-heating time, or the operating mode changing time from pre-heating to normal operation, or the soft-start time. Hence, these embodiments contain a reduced number of components.

Figure 3:
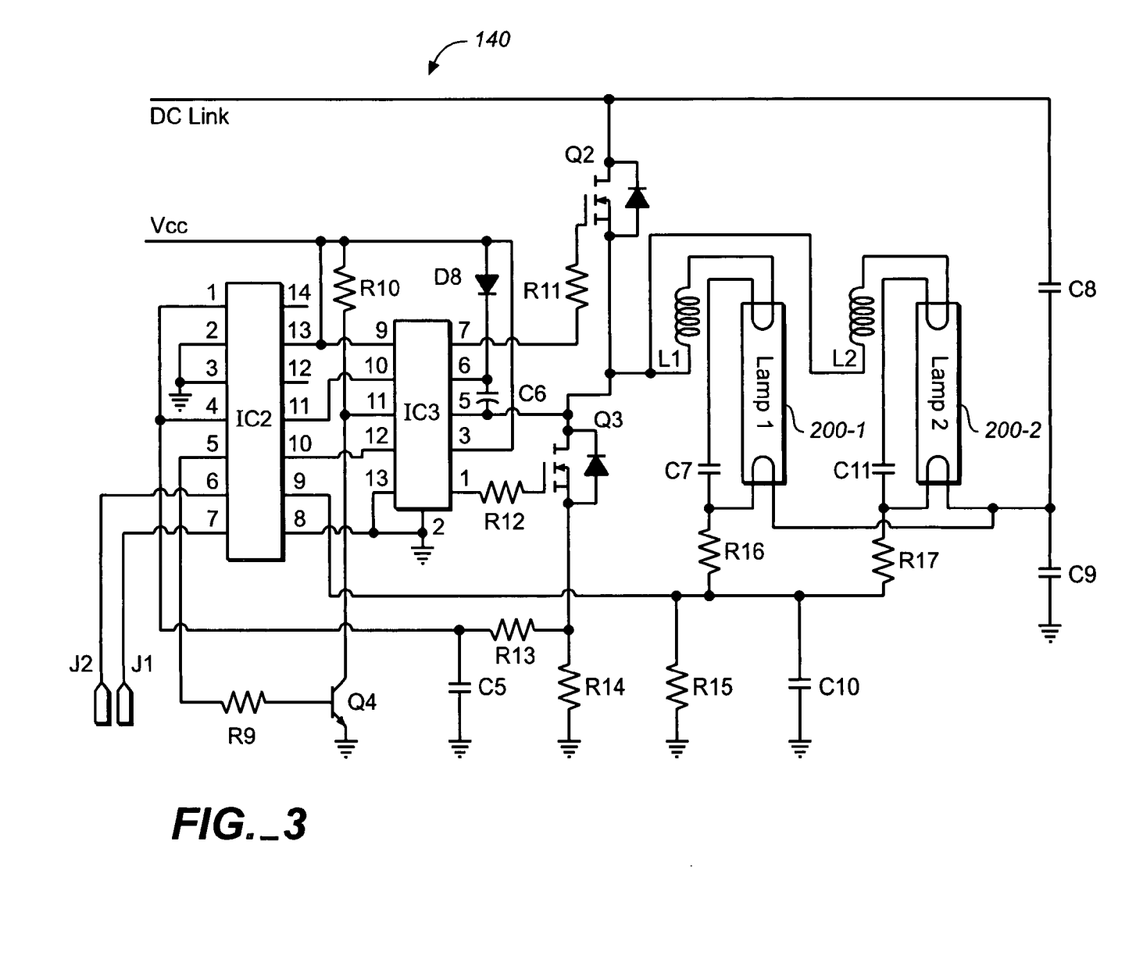
FIG. 3 illustrates a digital ballast according to embodiments of the invention.

FIG. 3 illustrates an embodiment of digital ballast 140, powering two lamps 200-1 and 200-2, which are coupled in parallel. Other embodiments can have several lamps, connected to each other in various circuits. The illustrated embodiment has a joint current feedback loop 160 as the total current in the output stage is measured by resistor R14, similarly to the embodiment of FIG. 2.

The illustrated embodiment has coupled voltage feedback loops 180. Here separate resistors R16 and R17 measure the voltage of lamp 200-1 and 200-2. However, resistor R16 and R17 are coupled and provide a joint feedback voltage for digital controller IC2. Other embodiments can have separate voltage feedback loops 180-1 and 180-2. The other components of lamp-control circuit 100 in FIG. 3 and their functions in are analogous to those of FIG. 2.

Figure 4:
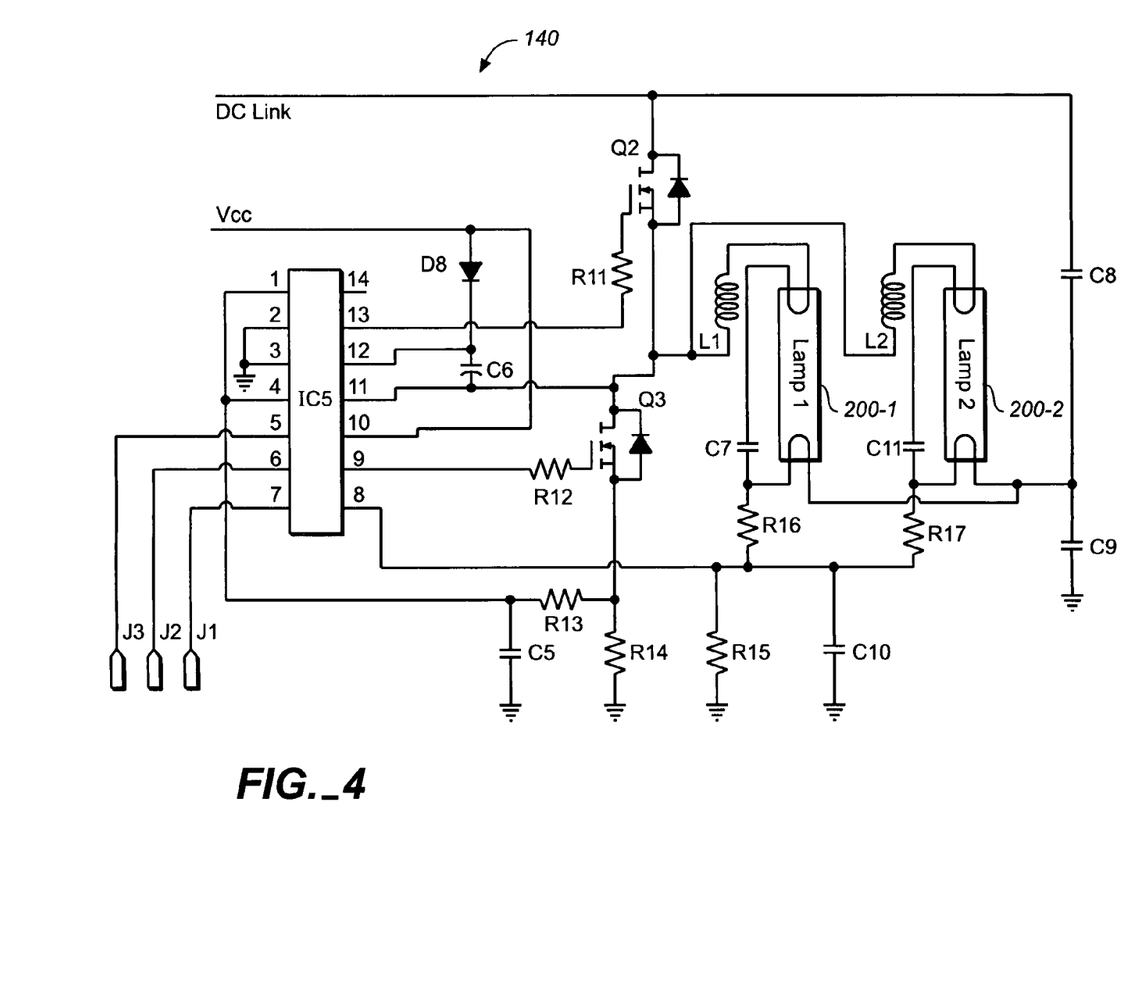
FIG. 4 illustrates a digital ballast according to embodiments of the invention.

FIG. 4 illustrates digital ballast 140 according to an embodiment of the invention. In this embodiment the functions of digital controller IC2 and power device driver IC3 are integrated into a single integrated chip IC5. The other components of lamp-control circuit 100 in FIG. 4 and their functions are analogous to those in FIG. 2.

Next, the operation of lamp-control circuit 100 will be described. In some embodiments of the method, lamp 200 is switched on in the following steps. First, lamp 200 is heated up in a pre-heating step; then lamp 200 is ignited in an ignition step; finally the frequency of the applied current is adjusted so that lamp 200 reaches the desired operating brightness.

Lamp 200 is pre-heated for at least the following reasons. During operations a voltage is applied across the electrode of lamp 200 to extract electrons form the electrode or filament. If the electrode or filament is cold, electrons are extracted from deeper within the material of the electrode or filament. This deep extraction damages the material of the electrode or filament, leading to its fast decay. Hence, the lamp life is significantly reduced if the lamp is ignited by applying a high voltage without pre-heating the electrodes or filaments. Pre-heating the electrode or filament before igniting lamp 200 can reduce this problem. When electrons are extracted from a hot electrode or filament, they exit from the vicinity of the surface, causing considerably smaller damage and decay. For this reason, applying pre-heating to fluorescent lamps extends their life expectancy considerably.

Figure 5:
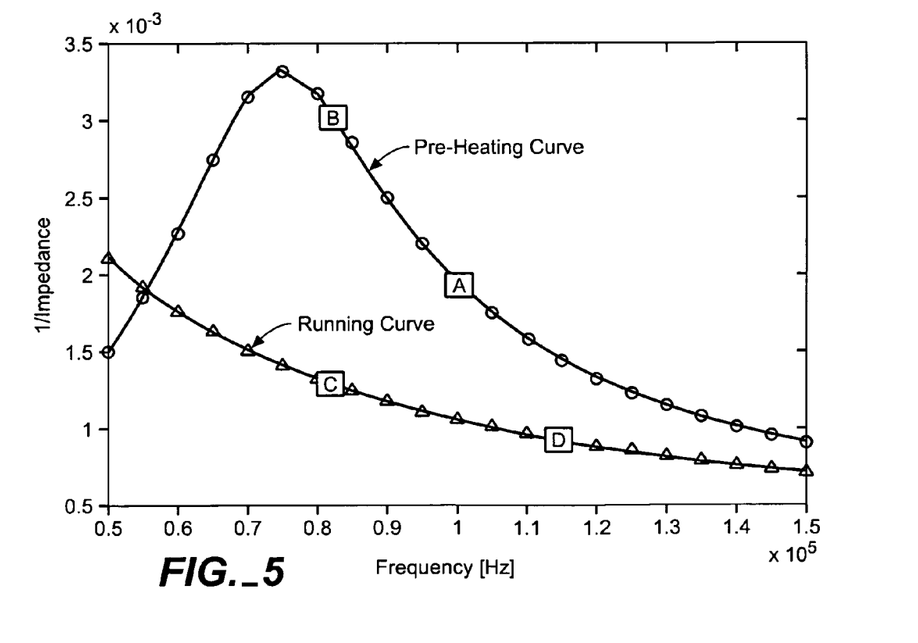
FIG. 5 illustrates frequency—impedance characteristics in relation to embodiments of the invention.

FIG. 5 illustrates steps of preheating lamp 200. Fluorescent lamp 200 has non-linear impedance-frequency characteristics. Referring to FIG. 1, inductor L1 is coupled in series to lamp 200, while capacitor C7 is coupled in parallel with lamp 200. When the preheating starts, lamp 200 has not ignited yet and the lamp impedance is very high. Hence, the combined lamp—capacitor—inductor circuit essentially consists of capacitor C7 and inductor L1, thus having a low impedance (and thus a high inverse impedance) in the vicinity of the resonance frequency of the resonant circuit of L1 and C7. Correspondingly, the impedance-frequency characteristics of this combined circuit is characterized by the "Pre-Heating Curve" of FIG. 5. In FIG. 5, the horizontal (x) axis is the frequency of the applied current, provided by lamp-control circuit 100, and the vertical (y) axis indicates the inverse of the combined impedance of lamp 200, inductance L1, and capacitor C7.

During the operation of the ignited lamp, the impedance-frequency characteristics is illustrated by the "Running Curve". As described above, when lamp-control circuit 100 is powered in the vicinity of the resonance frequency of the resonant circuit of L1 and C7, the inverse impedance during pre-heating is large, showing a maximum at some intermediate frequency, such as about 75 kHz, related to the resonance frequency, and decays above this frequency. The inverse impedance is greater during the pre-heating of the lamp than during the operating of the ignited lamp in the frequency range of 80~100 kHz. As shown, the Running Curve decays in the whole displayed frequency region.

Pre-heating can be started at some high frequency, denoted by A in FIG. 5. At this high frequency the impedance of capacitor C7, which is inversely proportional to the frequency, is low. Therefore, the voltage across capacitor C7 is low and the parallel-coupled lamp 200 does not ignite because of this low voltage drop. Referring to FIGS. 1, 3, and 4, in this pre-heating period the current is flowing through inductor L1, the electrode or filament of lamp 200, and then through capacitor C7. When the current flows through the electrode or filament of lamp 200, the electrode or filament heats it up by Ohmic heating. Pre-heating may last from a fraction of a second to several seconds, including the range of about 1 to 2 seconds.

Next, the frequency of the driving current is lowered by a software-programmed method, which will be described below, to reach point B in FIG. 5. At this lower frequency the impedance of capacitor C7 is considerably higher. Lamp-control circuit 100 can control the driving current essentially independently from the frequency. If the driving current is controlled not to change too much during the change of frequency from point A to point B, then the voltage across capacitor C7 increases considerably with the decrease of the frequency. Since capacitor C7 is in parallel to lamp 200, the voltage of lamp 200 increases accordingly. The frequency of point B is chosen such that the voltage across lamp 200 is capable of igniting lamp 200. Once lamp 200 is ignited, its impedance drops. This lower lamp-impedance will redirect a large fraction of the current of capacitor C7 through lamp 200. In embodiments the values of C7 and L1 are chosen such that the C7-L1 circuit is near resonance at the operating frequencies. Accordingly, the impedance of the lamp is small. Once lamp 200 ignites, the circuit containing inductor L1 and low impedance lamp 200 in series, with capacitor C7 in parallel, is farther away from its resonance condition. Hence, the impedance of the circuit increases, or, equivalently, its inverse impedance decreases. Correspondingly, the current flowing through the electrode or filament of the lamp decreases and the lamp preheating is stopped. Therefore, the frequency-impedance characteristics of the circuit, containing lamp 200, capacitor C7 and inductance L1, jumps from the Pre-Heating Curve to the Running Curve. In particular, the operating point jumps from point B to point C, when lamp 200 ignites.

Once lamp 200 ignited, a large amount of current is flowing through lamp 200 and lamp 200 starts operating brightly. Therefore, in a final step lamp 200 can be dimmed to the desired level of brightness by increasing its frequency from point C to point D.

Figure 6A:
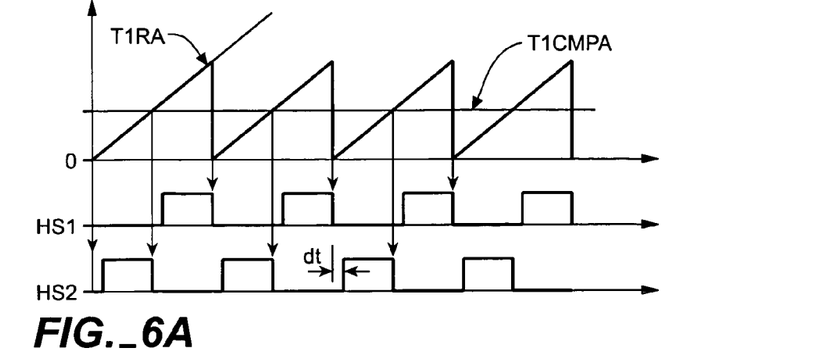
FIGS. 6A–C illustrate various signals according to embodiments of the invention.
Figure 6B:
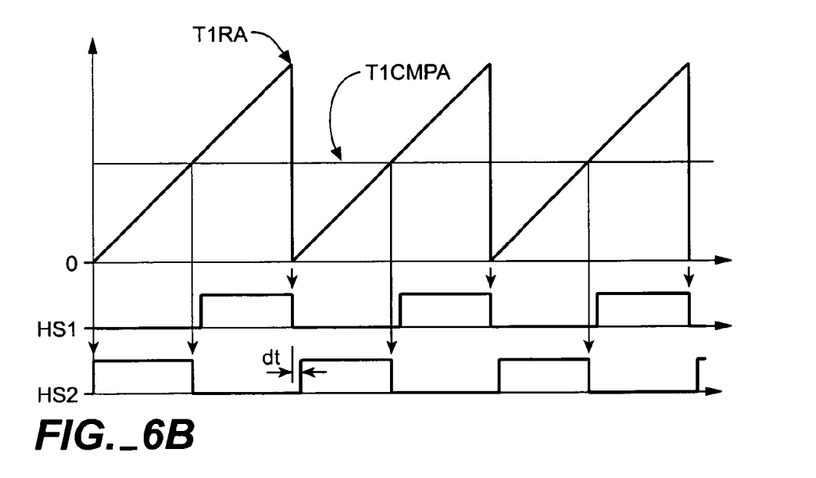
Figure 6C:
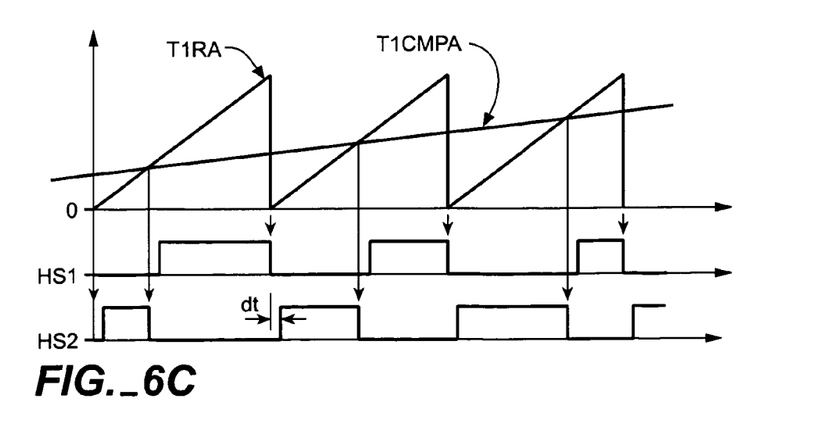

FIGS. 6A–C illustrate a method, according to embodiments of the invention of controlling the frequency of the output current of lamp-control circuit 100. The horizontal axis corresponds to the passing of time, the vertical axis describes an internal count value of IC2 and the logic levels of HS1 and HS2.

FIG. 6A illustrates that a counter increases a voltage in essentially equal time steps in essentially equal voltage increments until it reaches a preset maximum value stored in a register of IC2, named T1RA. If the counter value reaches the value stored in T1RA, the counter is reset to 0 and the cycle starts again. By varying the maximum value in T1RA, the frequency of the generated signal is varied, as illustrated in FIG. 6B. Thus, this method is often referred to as a Pulse Frequency Modulation (PFM) technique.

Digital controller IC2 has a further internal register T1CMPA (sometimes referred to as a "compare register"), storing a value. The counter value is also compared to the value stored in T1CMPA by a comparator in IC2. The system generates two driver signals, HS1 and HS2, whose values reflect the result of the comparison. When the counter value exceeds the value stored in T1CMPA, HS2 switches to low and HS1 switches to high. When the counter value becomes less than the T1CMPA value, then HS1 switches to low and HS2 switches to high.

FIG. 6C illustrates that the pulse width of HS1 and HS2 can be controlled by varying the value in T1CMPA. Therefore, the Pulse Width Modulation (PWM) technique can be used by varying the value of the T1CMPA register. In some embodiments, the driving frequency is changed instead of the pulse width. In these embodiments digital controller IC2 controls the T1CMPA value to essentially half of the maximum counter value stored in the T1RA register. Then the ON and OFF time of HS1 and HS2 are essentially the same, up to a small time lag dt (see below). In such embodiments HS1 and HS2 are complementary signals: when HS1 is high then HS2 is low and when HS1 is low then HS2 is high.

As shown in FIGS. 6A–C, in some embodiments there is a time lag "dt" between the switching instances of HS1 and HS2. This time lag is sometimes called a dead time because no power is transferred during this period. In some embodiments HS1 is the driving signal of power device Q3 ("low side") and HS2 is the driving signal of power device Q2 ("high side"). The dt time lag introduces a delay between the switching edges of the HS1 and HS2 signals. Therefore, power devices Q2 and Q3 are not turned on simultaneously, thus avoiding damage to the circuitry. This dt dead time can be adjusted by setting a value in a dead time control register.

When HS1 is high and HS2 is low, then power device Q3 is closed and power device Q2 is open. A duty ratio can be defined as the time during which HS1 assumes a high value, divided by the one period cycle time of HS1. The duty ratio can be controlled in this embodiment by the comparison register, T1CMPA. In the embodiment of FIG. 6B the duty ratio is chosen to be essentially 50%. In this case the output current has a symmetrical waveform and no DC component. In asymmetric output currents, where the positive and negative current amplitudes are different and thus have a DC component, lead to a degradation of lamp 200 and to a shortening of its life.

When the counter value exceeds the value stored in compare register T1CMPA, HS2 switches to low essentially immediately and HS1 switches to high with a time lag. When the counter value is lower than the value stored in compared register T1CMPA, then HS1 switches to low essentially immediately and HS2 switches to high with a time lag.

FIG. 6B illustrates another embodiment, where the value of the control value T1RA is higher, so that the driving frequency is lower than in the embodiment of FIG. 6A, while the duty ratio is maintained at essentially 50%.

FIG. 6C illustrates an embodiment with control voltage T1CMPA increasing in time. As a consequence, the length of the HS signals varies in time. In this embodiment the HS1 signals are getting shorter and the HS2 signals are getting longer. This is one possible method for obtaining a Pulse Width Modulated (PWM) signal at the output terminal.

Embodiments using other variants of the above-described PWM and PFM methods are also meant to be within the scope of the invention.

A further function of lamp-control circuit 100 is to sense the end of lamp life by sensing the lamp current during pre-heating. During pre-heating the voltage level sensed at pin 9 of digital controller IC2 is relatively low in the normal condition. If the lamp filament is broken, the sensed voltage level becomes higher. Digital controller IC2 can recognize this "filament broken" condition by monitoring the voltage level sensed at pin 9. In reaction to this "filament broken" signal, digital controller IC2 can turn off transistor Q4. The turning off of Q4 makes power device driver IC3 turn off the output current. By using this scheme, lamp-control circuit 100 is capable of identifying the end of the life of lamp 200.

A further function of lamp-control circuit 100 is that if lamp ignition fails, then digital controller IC2 can repeat the pre-heating procedure over predefined intervals. If the ignition still fails, the system enters in to a halt mode to protect the system from damages.

As described above, current feedback loop 160 provides short circuit or load fault protection. If there is an over current flowing through power devices Q2 or Q3 or lamp 200, it generates a voltage across resistor R14 with a value that is higher than in a normal condition. This abnormal condition is sensed by comparing the sensed voltage with an internal reference value in digital controller IC2. However, in some embodiments the processing speed of digital controller IC2 is too low to cut off the load circuit in a timely manner.

Figure 7:
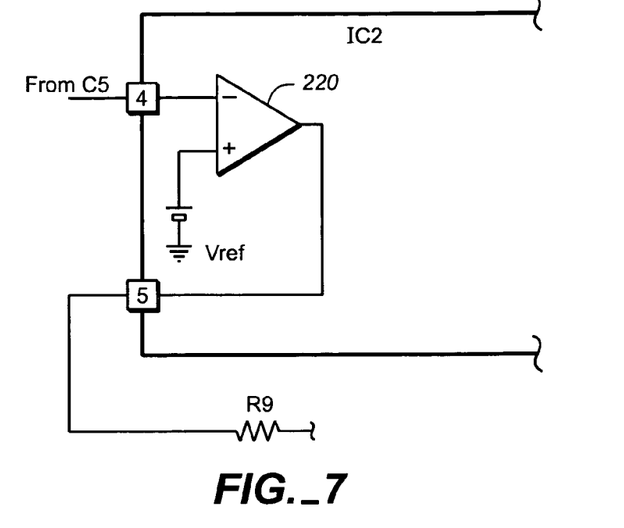
FIG. 7 illustrates a portion of a digital controller according to embodiments of the invention.

FIG. 7 illustrates that in some embodiments digital controller IC2 has an internal comparator 220 for providing sufficiently fast fault or short protection. Internal comparator 220 of digital controller IC2 is coupled to pins 4 and 5 in the IC2 FMS7401 from Fairchild Semiconductor. If the voltage associated with the current, sensed by resistor R14 becomes larger than a reference voltage level Vref, the output of internal comparator 220 becomes low at the shutdown-pin 5. A low signal at pin 5 is coupled into the base of control transistor Q4, turning Q4 off. Turning Q4 off generates an OFF signal for power device driver IC3 at pin 11, leading to the turning off of the output current and therefore providing adequately fast fault/short protection.

Similarly, if lamp 200 is removed for whatever reason, the just described sense-and-control mechanism recognizes the lamp removal very quickly, without executing any programs, and provides adequate protection.

Figure 8:
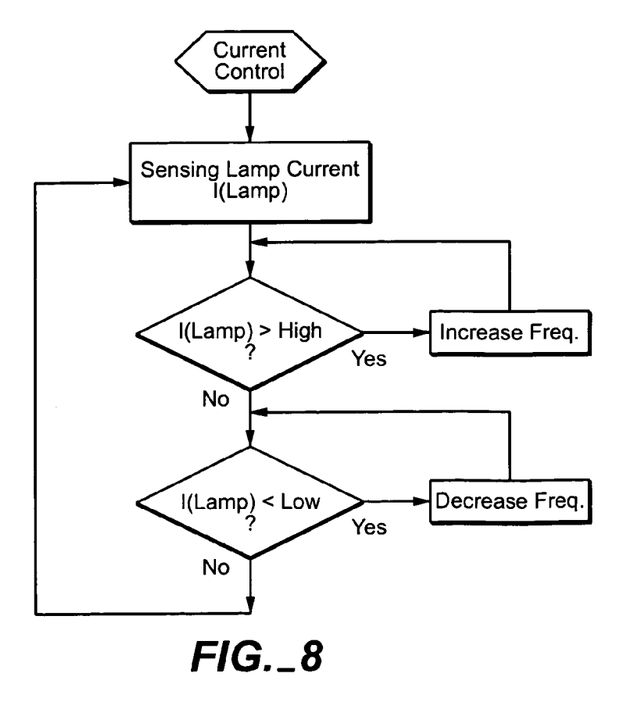
FIG. 8 illustrates a method of current control according to embodiments of the invention.

FIG. 8 illustrates that an additional function of digital controller IC2 is to control the lamp current to an essentially constant level by sensing the lamp current through current feedback loop 160. Embodiments of this invention use a closed-loop control method. An essentially constant brightness can be achieved by using this closed-loop method even if the lamp characteristics are slightly changing because of, for example, lamp degradation or temperature variation.

In the first step the lamp current I(lamp) is sensed by resistor R14. If the sensed current in current feedback loop 160 I(lamp) is greater than a predefined "High" level, then digital controller IC2 increases the driving frequency so as to reduce the lamp current. If the sensed current I(lamp) is lower than a predefined "Low" level, then digital controller IC2 decreases the driving frequency so as to increase the lamp current. These steps can be repeated until the current I(lamp) is sensed between the "High" and "Low" levels. In addition, the digital proportional-integrate-differential (PID) control method can be used for having a low setting time and low overshoot lamp current without steady-state current error.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A lamp-control circuit, comprising:
a power factor corrector;
a digitally controlled ballast, comprising power devices and coupled to the power factor corrector, the ballast operable to power a lamp;
a current feedback loop, coupled between at least one of the power devices and the digitally controlled ballast, configured to provide a current feedback signal; and
a voltage feedback loop, coupled between the lamp and the digitally controlled ballast, configured to provide a voltage feedback signal, wherein
the digitally controlled ballast is configured:
to generate a counter signal in accordance with increasing counter values; and
to generate a control voltage, thereby
generating a pulse frequency modulated control signal in response to at least one of the current feedback signal and the voltage feedback signal.

2. The lamp-control circuit of claim 1, wherein:
the power factor corrector is operable to generate AC input current and voltage essentially in phase with each other.

3. The lamp-control circuit of claim 1, the digitally controlled ballast comprising:
a controller, coupled to the power factor corrector by a DC link; and
an output stage, comprising the power devices and coupled to the controller.

4. The lamp-control circuit of claim 3, the controller comprising:
a digital controller, coupled to the power factor corrector by the DC link; and
a power device driver, controlled by the digital controller and configured to drive the output stage.

5. The lamp-control circuit of claim 4, wherein:
the digital controller and the power device driver are integrated on a chip.

6. The lamp-control circuit of claim 4, wherein the output stage comprises:
two power devices coupled in series, having an output terminal coupled in between the power devices; wherein
the power devices are selected from the group of power MOS-FETs and power bipolar junction transistors.

7. The lamp-control circuit of claim 6, wherein:
the current feedback loop comprises a current sensor, coupled to the two power devices, thereby operable to sense the current of at least one power device.

8. The lamp-control circuit of claim 7, wherein:
the current sensor is one of a current sensing resistor and a current transformer, coupled in series with the two power devices; and
the current feedback loop comprises a resistor-capacitor filter, coupled between the current sensing resistor and the digital controller.

9. The lamp-control circuit of claim 4, wherein
the voltage feedback loop comprises a voltage sensor, coupled to the lamp, thereby operable to sense the voltage of the lamp.

10. The lamp-control circuit of claim 9, wherein:
the voltage sensor is a voltage sensing resistor, coupled to the lamp; and
the voltage feedback loop comprises a resistor-capacitor filter, coupled between the voltage sensing resistor and the digital controller.

11. The lamp-control circuit of claim 4, the digital controller comprising:
a comparator, configured to compare a signal of at least one of the current feedback loop and the voltage feedback loop to a reference voltage.

12. The lamp-control circuit of claim 1, wherein:
the digitally controlled ballast is configured to receive external commands while in operation.

13. The lamp-control circuit of claim 1, wherein:
the lamp-control circuit is operable to power a lamp selected from the group of cold cathode lamps, fluorescent lamps, high pressure discharge lamps, metal halide lamps, high intensity discharge lamps, and gaseous lamps.

14. The lamp-control circuit of claim 1, wherein:
the lamp-control circuit is operable to control more than one lamps, wherein
the lamps are coupled to corresponding voltage feedback loops.

15. A method of operating a lamp-control circuit, the circuit comprising a digital controller, an output stage, a current feedback loop, and a voltage feedback loop, the method comprising:
receiving one of a current feedback signal and a voltage feedback signal by the digital controller;
generating a digital control signal in response to the received signal by the digital controller, comprising:
generating a counter signal in accordance with increasing counter values; and
generating a control voltage, thereby generating a pulse frequency modulated control signal by the digital controller; and
powering a lamp by the output stage according to the generated digital control signal.

16. The method of claim 15, the method comprising at least one of
receiving external control commands by the digital controller during the operation of the lamp-control circuit; and
sending status signals by the digital controller during the operation of the lamp-control circuit.

17. The method of claim 16, the receiving the external control commands comprises:
receiving external commands to vary a frequency of the digital control signal to digitally control the brightness of the lamp.

18. The method of claim 15, wherein the generating of a digital control signal comprises:
generating a "High" value for the digital control signal when the counter signal exceeds the control voltage; and
generating a "Low" value for the digital control signal when the control voltage exceeds the counter signal.

19. The method of claim 18, the output stage comprising a first and a second power device, wherein powering the lamp comprises:
opening the first power device and closing the second power device, when the digital control signal is High; and
closing the first power device and opening a second power device, when the digital control signal is Low.

20. The method of claim 15, wherein generating a pulse width modulated control signal comprises:

generating a counter signal by increasing a voltage level in accordance with increasing counter values; and generating a control voltage, varying in time.

21. The method of claim 15, wherein powering the lamp comprises:

pre-heating the lamp by powering the lamp at a pre-heating frequency, wherein at the pre-heating frequency the voltage across the lamp is below an ignition voltage.

22. The method of claim 21, wherein powering the lamp comprises:

igniting the pre-heated lamp by powering the lamp at a lower ignition frequency, wherein at the ignition frequency the voltage across the lamp exceeds an ignition voltage.

23. The method of claim 15, wherein the method comprises:

sensing a current of the output stage by the current feedback loop;

generating the current feedback signal according to the sensed current;

receiving the current feedback signal by the digital controller; and controlling the frequency of the digital control signal to control the sensed current into a predetermined range.

24. The method of claim 15, wherein powering the lamp comprises:

sensing a voltage of the lamp by the voltage feedback loop;

generating the voltage feedback signal according to the sensed voltage;

coupling the voltage feedback signal into the digital controller; and controlling the frequency of the digital control signal to control the sensed voltage into a predetermined range.

25. The method of claim 15, the method comprising:

generating the digital control signal to control at least one of a lamp preheating time, a soft-start time, an ignition time, a powering frequency and an ignition frequency.

26. The method of claim 15, the method comprising:

generating the digital control signal to provide at least one of over-load protection, over-current protection, short protection, and lamp malfunction protection.

* * * * *